Trcka et al.

[11] 3,863,246
[45] Jan. 28, 1975

[54] BACKLIGHTED DISPLAY APPARATUS FOR PREVENTING DIRECT VIEWING OF LIGHT SOURCES

[75] Inventors: James S. Trcka, Cedar Rapids; David C. Yeoman, Toddville, both of Iowa

[73] Assignee: Collins Radio Company, Dallas, Tex.

[22] Filed: July 9, 1973

[21] Appl. No.: 377,487

[52] U.S. Cl............. 340/324 R, 40/130 K, 40/137, 340/336
[51] Int. Cl................................................. G09f 9/32
[58] Field of Search .......... 40/130 R, 130 K, 132 E, 40/137; 340/324 R, 324 M, 378, 380, 336

[56] References Cited
UNITED STATES PATENTS

| | | | |
|---|---|---|---|
| 3,234,542 | 2/1966 | Brown et al. | 340/336 |
| 3,568,177 | 3/1971 | Hasler | 340/324 R |
| 3,653,138 | 4/1972 | Cooper | 40/137 |
| 3,698,793 | 10/1972 | Tellerman | 40/130 K |

Primary Examiner—John W. Caldwell
Assistant Examiner—Marshall M. Curtis
Attorney, Agent, or Firm—Bruce C. Lutz

[57] ABSTRACT

Apparatus for providing backlighting of a display comprising the use of louvered material between a light source and the sides of a prism wherein the prism is utilized to transmit and direct light rays to the display surface. The use of the prism in some embodiments eliminates direct viewing of the light source through the louvered material.

9 Claims, 4 Drawing Figures

3,863,246

BACKLIGHTED DISPLAY APPARATUS FOR PREVENTING DIRECT VIEWING OF LIGHT SOURCES

THE INVENTION

The present invention is generally related to display apparatus and optics and is more specifically directed toward the apparatus for and the method of lighting a display from the back without the interference of direct light rays from a source reaching the viewer in the viewing area design range.

Louvered material has been used to backlight display apparatus such as shown in a Cooper U.S. Pat. No. 3,653,138 issued Apr. 4, 1972. However, the Cooper apparatus tends to provide unevenness of intensity throughout the display indicia range and further produces problems in some environments such as airplane cockpits by the direct transmission of source light through the display surface which is detrimental to the night vision of persons operating the aircraft.

It is therefore an object of the present invention to provide an improved backlighted display apparatus.

Further objects and advantages of the present invention will be ascertained from a reading of the specification and appended claims in conjunction with the drawings; wherein:

Figure 2:
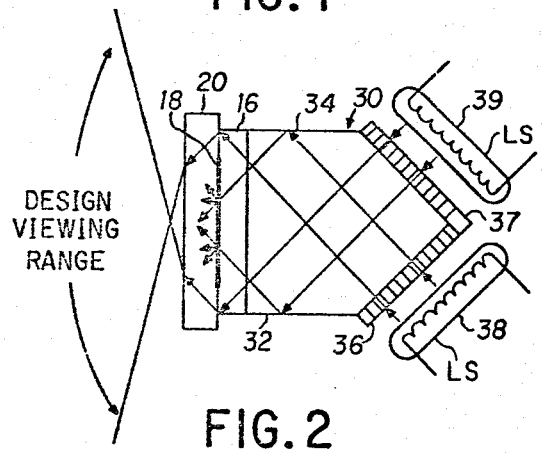
FIG. 2 is a further version of the invention using a five sided prism.
Figure 3:
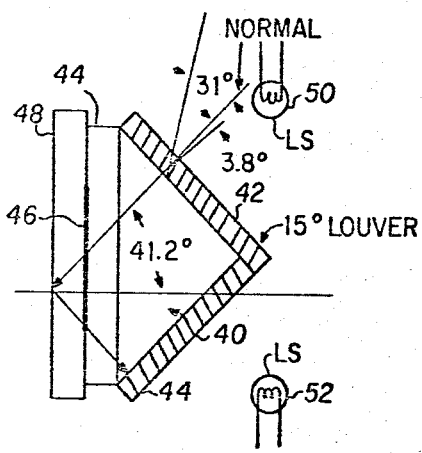
Figure 4:
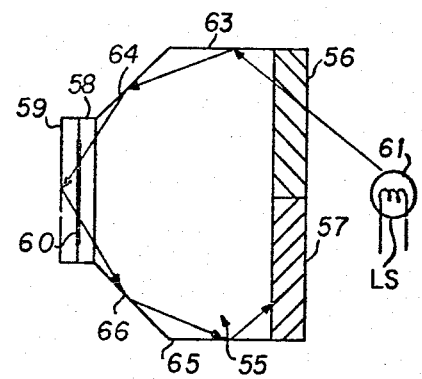

FIG. 3 is a third embodiment of the invention using a three sided prism wherein light from a source is controlled or directed such that the angle of incidence with respect to surface 48 is maintained greater than the critical angle whereby only diffused light escapes from the display surface and specular light is internally reflected; and FIG. 4 is a further version of FIG. 2 but using the teachings illustrated in FIG. 3.

DETAILED DESCRIPTION

Figure 1:
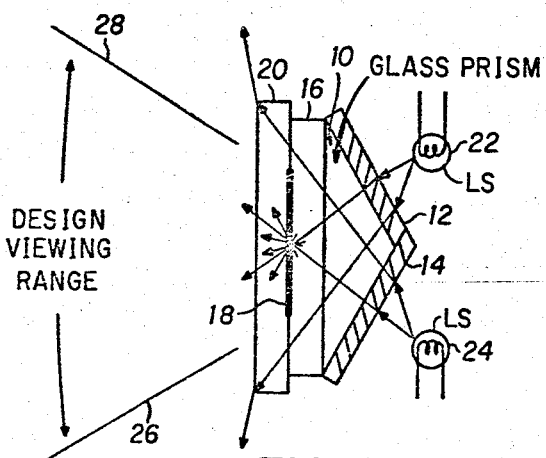
FIG. 1 is a first embodiment of the present invention using a three sided prism.

In FIG. 1 a prism made of optically transparent material generally designated as 10 is shown having louvered material 12 and 14 attached to the minor surfaces thereof. Minor surfaces are defined to mean the shorter legs of the triangular cross section of a prism and the hypotenuse or longest leg defined as the major surface. The material is attached by bonding with optically clear adhesive which has an index of refraction which is nearly the same as that of the louvered material and the prism material. The indices of refraction of these materials are larger than that of air. A perfect match of indices of refraction will eliminate any refraction occurring internally. The major surface is attached to a display 16 such as a liquid crystal display. A liquid crystal display may consist of nematic liquid crystal material 18 sandwiched between two plates of glass 16 and 20 which contains transparent conductive material deposited on the inner surfaces of the glass. The material is contained on the glass in the pattern to be displayed, most generally in a segment pattern, with conductive leads brought to terminations. The display is actuated by applying an electric field across the liquid crystal material. Detailed operation of this phenomenon has been previously detailed in several U.S. Pats. such as Nos. 3,499,702, 3,674,341, and 3,499,112.

As will be realized, the diffusing material may be any indicia such as a frosted pattern on a transparent plexiglass plate or may be some type of a negative.

On the side of the louvered material 12 opposite that bonded to a minor surface of prism 10 is a light source 22. A further light source 24 may be similarly disposed with respect to louvered material 14. The angles of the louvers and prism apex are selected to prevent viewing of the light source within the desired viewing range.

The louvered material 12 and 14 can be obtained from Minnesota Mining and Manufacturing Company in St. Paul, Minn., under the trade name of display film or light control film, and may be obtained having the louvers situated at different angles with respect to the surface of the material. As will be noted, the louvered material pieces 12 and 14 overlap at the vertice of the prism to further prevent viewing of the light source from the front of the display. As will be noted from the arrows illustrated in FIG. 1, the light passing through the louver 12 from light source 22 is diffused when striking the diffusing display material 18 causing the ray to be visible within the viewing range. Where the scattering device is a liquid crystal display, the light rays which are in line with those striking the display are the strongest as shown by the length of the arrow. The light is then scattered making it visible from other angles. The light from light source 24 is also passed through a louver such as 14 and some of the light will strike the diffusing medium display area 18 at the same point as the light rays from source 22. Again, those which are directly in line with the incident light rays are the strongest. With this fact in mind, it will be apparent that viewing from directly in front of or normal to the surface of the material 20 provides the lowest intensity reading. Viewing from above or below this line tends to provide a greater intensity view of the diffusing material. However, by providing a light source on both sides of the prism the non-uniformity of intensity is minimized. Further, in those areas where the display does not cause light diffusion, it will be noted that some of the light rays pass completely through the various intersections of materials until they reach the left hand edge of material 20 which is a polished transparent material. At this point, the rays are refracted at the air material interface and pass from the display device. Refraction occurs in accordance with Snell's Law. However, this light remains specular and is not visible within the design viewing range. However, when the display is viewed from an angle outside the design range, then the light sources may be observed in the embodiment of FIG. 1.

DETAILED DESCRIPTION OF FIG. 2

The five sided prism 30 of FIG. 2 is shown attached to a display device with diffusing means 18 and transparent front surface 20 although the louvered means 36 and 37 and light source means 38 and 39 are renumbered to illustrate a different louver angle and different style light sources. However, the light rays pass through the louvered means and strike the reflectorized sides 32 and 34 where they are reflected and passed to the display surface. This embodiment prevents direct viewing of the light within the design range and tends to provide a more even distribution of light throughout the indicia area as symbolized by diffusing material 18. Such an arrangement can be used to increase the design field of view. By reflecting the light from the sides of the prism (32 and 34) the effect is as if the light sources are mounted behind and above and below the display. Thus, the incident rays arrive at a steeper angle than with other arrangements. The usable viewing range is bounded by these rays as they emerge from the display in specular form.

DETAILED DESCRIPTION OF FIG. 3

In FIG. 3 a three sided transparent prism generally designated as 40 has louvered material 42 and 44 attached to two legs or minor surfaces thereof wherein the prism 40 is a right angle prism with equal length minor sides, has its hypotenuse attached to a display device having a diffusing material 46 attached thereto or positioned between support 44 and a transparent protective surface 48. The louvered materials 42 and 44 are bonded in the same manner described in FIG. 1 and are positioned between the prism and light sources 50 and 52 labeled LS for convenience. For a specific embodiment, the material 42 and 44 is louvered at an angle of 15° with respect to a normal and the material is 0.030 inches thick. The thickness of the louvered material is such that there is a prescribed amount of underlap between the base of one louver and the opposite edge of the adjacent louver. This limits, in the embodiment shown, the passage of light rays through the louvered material to an angle of minus 3.8° to plus 31° from a normal to the surface of the material. By proper selection of the materials all of the indices of refraction can be very nearly the same such that very little refraction occurs within the assembly. If the protective surface 48 is considered to be soda lime glass, it may be determined from Snell's Law that the critical angle for this material is approximately 41°. By use of the proper angles and dimensions of the prism and the thickness of the louvered material as well as the louver angle the angle of any light rays passing through the louvered material and the prism from the light source will of necessity strike the surface of the glass 48 at an angle of at least 41.2° from the normal to the surface. Any light rays which do not strike the diffusing means 46 will pass to the surface of 48 and be reflected internally. Thus, there is no possibility of viewing specular light radiating from the display since no light is transmitted through the surface. The louvered material being black and highly absorbent in nature does not provide any reflection. Thus, the only light emitting from the display is that which is diffused by diffusing material 46, making this material visible to the observer.

The teachings of this embodiment can also be applied to the embodiment described in FIG. 2 whereby the light rays entering the prism through the louvered material is controlled so only those rays which intersect the front surface of the glass 20 do so at an angle of incidence greater than the critical angle and are thus reflected internally. As with FIG. 1, light rays striking material 46 will be scattered and made visible to an observer although not specifically illustrated.

DETAILED DESCRIPTION OF FIG. 4

A final embodiment comprises a six sided prism 51 with louver material 56 and 57 attached to one surface. The index of refraction of the prism material is larger than that of air and surfaces 63, 64, 65 and 66 are polished surfaces. A display device 58 is attached to the opposite parallel surface. The slant of the louvered materials 56 and 57 is selected so all light rays from a single source 61 which enter the prism strike the sides 63 and 64 or 65 and 66 at angles of incidence greater than the critical angle and therefore are reflected toward the display. While not shown specifically, light also enters the prism through louver 57. Rays which intersect the diffusing means 60 (also, not specifically illustrated) are scattered making the material visible to an observer. The slope of sides 64 and 66 are selected so the light rays are reflected from the surfaces at an angle which results in these rays intersecting the front surface of the display 59 at an angle greater than the critical angle. All specular light which intersects the front surface of 59 is then internally reflected.

While several specific embodiments of the present invention have been illustrated to show the versatility of the idea, we wish to be limited only to the concept of utilizing a prism having louvered material attached to one or more minor surfaces thereof for directing light between the light source and the display material. This prism may be any type of polygon but in certain embodiments it may be desirable that the polygon have specifically defined side angles in accordance with and relative to the angles of the louvered material such that there will be no specular light emitting from the display area. The light rays passing through the louvered material being restricted to this instance to striking the display surface at an angle of incidence greater than the critical angle. Thus, we wish to be limited only by the scope of the following claims.

We claim:

1. A device for use in backlighting a display comprising, in combination:
   prism means having two minor surfaces and one major surface;
   louvered material attached to said two minor surfaces of said prism;
   display material attached to said major surface of said prism means, light passing through the louvered material and said prism to said display material being diffused by defined areas of said display material and contrasting greatly with areas of no diffusion.

2. Apparatus as claimed in claim 1 wherein the louvered material comprises at least one sheet of material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces.

3. Apparatus as claimed in claim 1 wherein the display material is a nematic liquid crystal display device, the liquid crystal portion of the material providing the diffusion of light for viewing purposes, the louvered material providing the contrast with the liquid crystal display areas.

4. The apparatus of claim 1 comprising in addition:
   light source means positioned adjacent to said louvered material on the side opposite that attached to said prism whereby light is transmitted through the louvered material into the prism means whereby the direct light from said light source means is not visible within a defined display angle.

5. Apparatus as claimed in claim 4 wherein the combination of the prism means and the louvered material restricts light from said light source means passing through said louvered material, said prism means and the display material to the display surface thereof at less than the critical angle for the display surface of the display material.

6. Display apparatus comprising, in combination:
   prism means including at least first, second and third non-parallel surfaces;
   light source means positioned adjacent to said prism means;
   display means attached to at least one of said surfaces of said prism, said display means including a differential pattern of light diffusion and transparent areas defining the indicia to be displayed; and
   light controlling means intermediate said surfaces of said prism means and said light source means for passing light rays to said display means.

7. Apparatus as claimed in claim 6 wherein the combination of said light controlling means and said prism means allows light to pass from said light source to said display means only at angles greater than the critical angle of reflection of the surface of the display means.

8. The method of backlighting a display area comprising a diffusing indicia portion and an unlighted background comprising the steps of:
   controlling light direction from one or more sources;
   maintaining the control of direction such that the light source may not be viewed from the display area; and
   bonding a geometrically shaped light transmitting prism between the display area and the light source such that all light rays striking the display area at points other than the diffused indicia portion strike at an angle greater than the critical angle of incidence whereby no specular light is emitted from the display area.

9. The method of backlighting a display area comprising the single step of:
   controlling the direction of all light rays such that they strike the display area surface at an angle greater than the critical angle of incidence of the non-diffused indicia portions thereof.

* * * * *